3,059,126
Patented Oct. 16, 1962

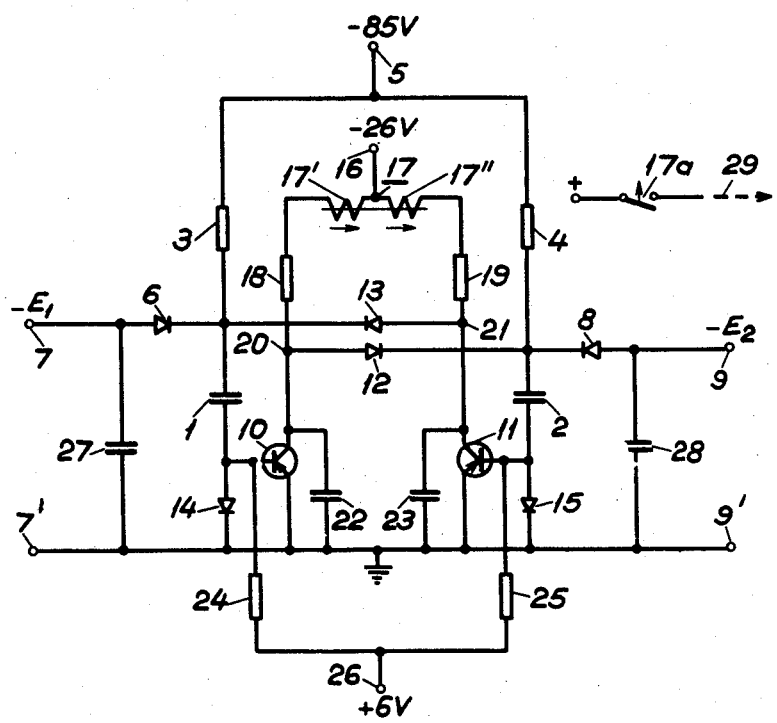

3,059,126
DEVICE FOR PRODUCING A SERIES OF ELECTRIC PULSES
Hugo Hansson, Vasteras, Sweden, assignor to Allmanna Svenska Elektriska Aktiebolaget, Vasteras, Sweden, a Swedish corporation
Filed Mar. 27, 1959, Ser. No. 802,550
2 Claims. (Cl. 307—88.5)

The present invention relates to a device for producing a series of electric pulses spaced by intervals, particularly for remote metering purposes.

In remote metering of a quantity by means of a series of electric pulses it has been proved advantageous to transform the metered quantity into a series of electric pulses spaced by intervals in which series the duration of each period, i.e. the duration of a pulse and an adjacent interval is proportional to the metered quantity as this makes it possible to obtain a remote metering which is very fast and to a high degree insensitive to distortion. In order to be able to transmit several separate metered quantities consecutively on the same channel it has further been proved desirable to have a pulse transmitting device which is capable of producing a series of pulses spaced by intervals in which the duration of each pulse is proportional to one metered quantity, whereas the duration of each interval is proportional to another metered quantity.

The object of the present invention is to provide a simple and inexpensive pulse series producing device which has two pairs of input terminals and which produces a series of electric pulses spaced by intervals, the duration of each pulse being proportional to a direct voltage connected to one of said pairs of input terminals and the duration of each interval being proportional to a direct voltage connected to the other pair of input terminals. If the two pairs of input terminals of the device are connected directly to one another and a direct voltage is connected to these inter-connected input terminals the device will evidently produce a series of pulses spaced by intervals in which series the duration of each period is proportional to the direct voltage connected to the input terminals.

The device according to the invention comprises two capacitors connected to a substantially constant direct current source, one of said capacitors being connected through a diode across one of said pairs of input terminals in such a way that the diode becomes conductive when the voltage of the capacitors exceeds the direct voltage connected to this pair of input terminals, whereas the other capacitor is connected through another diode in an equivalent way across the other pair of input terminals. The device further comprises two transistors which are connected by means of their emitters and collectors across one each of said capacitors and are controlled by the current through each one of the capacitors in such a way that the transistor which is connected in parallel across one of the capacitors is controlled by the current through the other capacitor and vice versa.

According to the invention, the transistors are preferably connected in series with biased diodes.

The device according to the invention may further comprise a pulse transmitting relay controlled by the currents through the transistors.

In the following, the invention is further described with reference to the accompanying drawing which, by way of example, shows one form of the invention.

The device in the drawing comprises two capacitors 1 and 2 which, in series with one large resistor 3 and 4 each, are connected to a terminal 5 connected to a constant direct voltage. The capacitor 1 is, through a diode 6, connected across one pair of input terminals 7, 7', whereas the capacitor 2, through a diode 8, is connected in an equivalent way across another pair of input terminals 9, 9'. The device comprises further two transistors 10 and 11, which in series each with one diode 12 and 13 respectively are connected in parallel across each one of the capacitors 1 and 2. The base-emitter circuit of the transistor 10 is connected in parallel across a diode 14 which is connected in series with the capacitor 1, whereas the base-emitter circuit of the transistor 11 is connected in parallel across a diode 15 which is connected in series with a second capacitor 2. The diodes 12 and 13 are biased by a direct voltage which is connected through the terminal 16, the two windings 17' and 17" of a polarised relay 17 and two resistors 18 and 19 to the junction points 20 and 21 between the diodes 12, 13 and the transistors 10, 11. The relay is provided with a contact 17a for transmission of a pulse series upon an output conductor 29. The transistors 10, 11 are further connected in parallel each by one capacitor 22, 23 and their bases are connected through the resistors 24, 25 to a positive direct voltage connected to the terminal 26. Finally two capacitors 27 and 28 are connected in parallel each across one of the pairs of input terminals 7, 7' and 9, 9'.

In the following description of the operation of the device, it is assumed that two direct voltages $E_1$ and $E_2$ are connected to each one of the pairs of input terminals 7, 7' and 9, 9' and that these direct voltages are lower than the voltage connected to the terminal 16. We assume further that at a certain moment the capacitor 1 is charged by a direct current from the terminal 5 through the resistor 3. A portion of this charge current flows through the transistor 10 whereas the remaining portion flows through the resistor 24 to the terminal 26. The portion of the current which flows through the transistor 10 keeps this fully conductive, due to which the collector of the transistor, that is the point 20, assumes substantially zero potential. The diode 12 is consequently also conductive and the capacitor 2 is consequently short-circuited by the diode 12 and the transistor 10. Due to this no charging current flows through the capacitor 2 and the transistor 11 is consequently cut off because of which its collector, that is the point 21, substantially assumes the potential —26 v. The diode 13 is consequently also non-conductive so long as the voltage of the capacitor 1 does not exceed 26 v., due to which no portion of the current through the resistor 3 can flow through the diode 13 and the transistor 11.

So long as the voltage of the capacitor 1 does not exceed the direct voltage $E_1$ connected to the pair of input terminals 7, 7', the diode 6 is also non-conductive, because of which the charging current through the capacitor 1 is determined solely by the voltage of the terminal 5 and the value of the resistor 3. As the transistor 10 is fully conductive a current flows from the terminal 16 through the relay coil 17', the resistor 18 and the transistor 10 to the earth. Through the other relay coil 17", however, only the leakage current of the transistor 11 flows, due to which the contact 17a of the relay is closed and a direct voltage pulse is transmitted to the output conductor 29 of the device. The leakage current of the transistor 11 flows through the resistor 25 to the terminal 26 because of which it is prevented from influencing the transistor 11 which is kept effectively cut off. As the charging current of the capacitor 1 is essentially constant the voltage of the capacitor 1 increases linearly with the time until it reaches the same value as the voltage $E_1$ connected to the input terminals 7, 7'. The direct voltage pulse upon the output conductor 29 will consequently have a duration which is proportional to the voltage $E_1$ connected to the input terminals 7.

When the voltage of the capacitor 1 reaches the same value as the voltage $E_1$, the diode 6 becomes conductive.

Then the capacitor 27 immediately takes over a large portion of the current through the resistors 3 due to which the charging current of the capacitor 1 sinks substantially momentarily to a low value. As the voltage connected to the terminal 26 and the resistor 24 is so dimensioned that this remaining current flows through the resistor 24 to the terminal 26, the transistor 10 is simultaneously cut off. As a result the collector of the transistor, that is the point 20, assumes a negative potential due to which the diode 12 is also blocked. A charging current then starts to flow from the terminal 5, through the resistor 4, to the capacitor 2, which begins to be charged. This charging current controls the transistor 11 so that it becomes conductive, whereby its collector, that is the point 21, substantially assumes the zero potential. Also the diode 13 becomes conductive, because of which the capacitor 1 is short-circuited by the diode 13 and the transistor 11 and consequently is discharged. The discharge current which flows through the diode 14 causes a low positive potential on the base of the transistor 10 so that this transistor is with certainty entirely cut off. When the transistor 10 becomes non-conductive the current through the relay coil 17' decreases until only the leakage current through the transistor 10 flows through the relay coil 17' whereas the current through the other relay coil 17" increases as the transistor 11 becomes conductive. The relay contact 17a consequently opens and interrupts the direct voltage pulse so that an interval is produced in the pulse series, which interval lasts as long as the capacitor 2 is charged.

The charging of the capacitor 2, the voltage of which increases substantially linearly with the time, continues until the voltage of the capacitor reaches the same value as the voltage $E_2$ connected to the input terminals 9, 9'. The duration of the interval transmitted on the output conducor 29 becomes consequently proportional to the direct voltage $E_2$ connected to the input terminals 9, 9'. When the voltage of the capacitor 2 reaches the value $E_2$ the diode 8 becomes conductive and the capacitor 28 will then substantiallly momentarily take over a large portion of the current through the resistor 4. Due to this a process will take place which is analogous with the process described above and which results in the diode 13 and the transistor 11 becoming non-conductive so that the capacitor again starts to be charged whereas the diode 12 and the transistor 10 become conductive and short-circuit the capacitor 2 which is discharged. Simultaneously the relay 17 changes position once again so that its contact 17a is closed and a new pulse is transmitted.

The above described switching processes from charging one capacitor to charging the other one are very fast, due to which the duration of the produced pulses and intervals is proportional to the direct voltages connected to the input terminals with great accuracy. It is, of course, not not necessary to derive the produced pulse by means of a relay but it can, for instance, also be derived from the voltage obtained across one of the resistors 18 and 19.

The biased diodes 12 and 13 have as their main object to prevent a leakage current flowing from the terminal 5 through any one of the resistors 3 and 4, through the cut off transistor, in which case the charging of the capacitors 1 and 2 would be less accurate. The diodes 12 and 13, however, also prevent the voltages of the capacitors exceeding the voltage connected to the terminal 16 and consequently also serve as an over-voltage protection for the capacitors 1 and 2 and the transistors 10 and 11. They also have the effect that if no voltages are connected to the input terminals 7, 7' and 9, 9' or if an interruption should occur in the input terminals the device will continue to produce a series of pulses spaced by intervals, in which the duration of the pulses and the intervals is proportional to the direct voltage connected to the terminal 16.

The capacitors 27 and 28 have, as already mentioned, as an object, to immediately take over when the diodes 6 and 8 become conductive, a large portion of the current which flows through the resistors 3 or 4 respectively so that a momentarily large reduction of the charging current of the capacitors 1 and 2 and then a fast and accurate switching operation is achieved. If the capacitors 27 and 28 were not present the charging currents of the capacitors 1 and 2 would, when the diodes 6 and 8 became conductive decrease comparatively slowly with a time constant determined by the value of the capacitors 1 and 2 and the normally large internal resistances in the voltage sources connected to the input terminals 7, 7' and 9, 9', due to which the switching would be comparatively slow and less accurate, which would impair the accuracy of the device. The capacitors 27 and 28 have also a smoothing effect upon the voltages connected to the input terminals 7, 7' and 9, 9' in the case that they comprise an alternating current component.

The diodes 14 and 15 have as their object to force the charging current through the capacitors 1 and 2 to flow through the transistors 10 and 11 and in doing so to keep these fully conductive, simultaneously as they set up a very low resistance for the discharge currents of the capacitors so that the capacitors will with certainty become entirely discharged between each charging.

The capacitors 22 and 23 have as their main object to protect the transistors 10 and 11 against the overvoltages which occur when the relay 17 operates. Simultaneously they prevent disturbances of short duration upon the input terminals 7, 7' and 9, 9' from causing a faulty switching from charging one capacitor to charging the other.

I claim:

1. A device for producing a series of electric pulses comprising two pairs of input terminals, a first capacitor and a first diode, a direct current source, a first connection connecting said first capacitor and first diode in series to said source, a second capacitor and a second diode, a second connection connecting said second capacitor and second diode in series to said source, means connecting each of said first and second connections to one of said pairs of input terminals, third and fourth diodes one in each of said connecting means, a first transistor having base and emitter electrodes connected across said first diode, a second transistor having base and emitter electrodes connected across said second diode, pulse transmitting means connected to at least one of said transistors and responsive to changes in the electrical condition thereof to transmit a pulse proportional to the direct voltage fed to one of said pairs of input terminals, the duration of each interval between pulses being proportional to the direct voltage fed to the other pair of input terminals.

2. A device as claimed in claim 1, comprising a fifth diode, a third connection connecting said first transistor and said fifth diode in series and connecting said first transistor and said fifth diode in parallel with said first capacitor, and a sixth diode, a fourth connection connecting said second transistor and said sixth diode in series and connecting said second transistor and said sixth diode and in parallel with said second capacitor.

References Cited in the file of this patent

UNITED STATES PATENTS

| 2,840,728 | Haugk et al. | June 24, 1958 |
| 2,866,925 | Wunderman | Dec. 30, 1958 |
| 2,879,412 | Hoge et al. | Mar. 24, 1959 |
| 2,892,953 | McVey | June 30, 1959 |
| 2,898,479 | McElroy | Aug. 4, 1959 |
| 2,907,932 | Patchell | Oct. 6, 1959 |
| 2,918,586 | Curtis | Dec. 22, 1959 |
| 2,956,241 | Huang | Oct. 11, 1960 |

FOREIGN PATENTS

| 794,284 | Great Britain | Apr. 30, 1958 |